Patented Sept. 28, 1926.

1,601,068

UNITED STATES PATENT OFFICE.

WILHELM HIRSCHKIND, OF PITTSBURG, CALIFORNIA.

PURIFICATION OF ALKALI-METAL XANTHATE SOLUTIONS.

No Drawing.   Application filed November 16, 1925. Serial No. 69,507.

This invention relates to a method for the purification of alkali metal xanthate solutions, and its object is to so change thiocarbonates or sulfides which are often found in such solutions, as to prevent them from interfering with the successful use of xanthate in the flotation process.

It will be understood by those skilled in the art that solutions of alkali metal xanthate usually contain small quantities of thiocarbonates or sulfides which orignate either in the manufacture of xanthate due to side reactions between the caustic alkali and carbon bisulfide, or in the decomposition of some of the xanthate on long standing. While processes have been devised by which solid xanthate may be produced containing a minimum of above mentioned impurities, there has not been a practical method to free solutions from such impurities. The presence of sulfides and thiocarbonates in xanthate has been found to interfere with the successful use of xanthate in the flotation process.

The purpose of this invention is to free solutions of alkali metal xanthate from these objectionable impurities of whatever origin.

It has been discovered that by adding a mineral acid, such as sulphuric or hydrochloric acid to a solution carrying sulfides or thiocarbonates under thoro agitation, the complete decomposition of thiocarbonates or sulfides takes place before any of the xanthate in the solution is attacked. The reaction products are alkali metal salts, and hydrogen sulfide, or alkali metal salts, hydrogen sulfide and carbon bisulfide, respectively, according to the following equations:

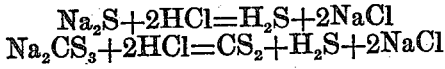

The hydrogen sulfide escapes in gaseous form while the alkali metal salts or the alkali metal salts and carbon bisulphide remain in the solution the latter two substances having no detrimental effect in the flotation process. If desired, the carbon bisulphide can be removed from the solution by a low temperature evaporation, leaving a solution carrying instead of thiocarbonates and sulfides, alkali metal salts.

It has also been found that where carbonates are present, that the decomposition with the same acids takes place before any of the xanthate in the solution is attacked, liberating carbon dioxide and leaving only the alkali metal salts.

Alkali metal salts are not very soluble in concentrated xanthate solution, and are, therefore partly precipitated, the quantity depending on the alkali metal ion concentration of the original solution.

The manner of the operation is as follows: The total quantity of acid to be added is calculated from the analysis of sulfides, thiocarbonates and carbonates and sulfides present, by method as published in the Engineering and Mining Journal Press, vol. 119, p. 968, 1925, or by any other accurate method. Thereupon the calculated quantity of acid is added to the solution while the latter is under thoro agitation and with care to prevent a local excess of acid in the mass at any place. Experiments upon an extensive scale prove that the decomposition of sulfides, thiocarbonates, and carbonates can be effected without loss of any xanthate.

Ordinarily, the best plan is to use a dilute acid, but strong acids may be used if the agitation is sufficiently thorough to prevent local heating.

Generally, the amount of acid required to react with sulphides present will not be such as to bring about any great dilution. The strength of xanthate solution can in practically every case be so chosen that after dilution with acid it will still be sufficiently concentrated for flotation purposes.

The term carbonates is intended to include not only the usual simple carbonates, but other compounds of the nature of thiocarbonates as well.

Having thus described my invention what I desire to secure by Letters Patent of the United States is as follows, but modifications may be made in carrying out the invention, as shown in the above particularly described form thereof, within the purview of the annexed claims:

1. A method of purifying alkali metal xanthate solution which consists in adding a mineral acid thereto in substantially the theoretical amount to react with all the carbonates, thiocarbonates, sulphides, and other impurities present.

2. A method of purifying alkali metal xanthate solution which consists in adding a mineral acid thereto in substantially the theoretical amount to react with all the carbonates and sulphides present, and agitating the solution violently during the addition of the acid.

3. A method of purifying alkali metal xanthate solution which consists in adding substantially the theoretical amount of mineral acid to react with the carbonates or sulphides present and thoroly agitating the solution until the reaction is complete.

4. A method of purifying alkali metal xanthate solution which consists in adding sulphuric acid thereto in substantially the theoretical amount to react with all the carbonates and sulfides present.

5. A method of purifying alkali metal xanthate solution which consists in adding sulphuric acid thereto in substantially the theoretical amount to react with all the carbonates and sulphides present, and agitating the solution violently during the addition of the acid.

In testimony whereof I have hereunto set my hand this 9th day of November, A. D. 1925.

WILHELM HIRSCHKIND.